United States Patent
Kocic et al.

(10) Patent No.: US 9,429,416 B2
(45) Date of Patent: Aug. 30, 2016

(54) ACCESSORY FOR COORDINATE MEASURING MACHINE

(71) Applicant: TESA SA, Renens (CH)

(72) Inventors: Milan Kocic, Pawtucket, RI (US);
Houssem Ben Salem, Ecublens (CH);
Emilio Casanova, Lausanne (CH)

(73) Assignee: TESA SA, Renens (CH)

( * ) Notice: Subject to any disclaimer, the term of this patent is extended or adjusted under 35 U.S.C. 154(b) by 21 days.

(21) Appl. No.: 14/099,246

(22) Filed: Dec. 6, 2013

(65) Prior Publication Data

US 2015/0159993 A1    Jun. 11, 2015

(51) Int. Cl.
| | |
|---|---|
| *G01B 11/14* | (2006.01) |
| *G01B 11/00* | (2006.01) |
| *G01B 21/04* | (2006.01) |
| *G01B 5/012* | (2006.01) |

(52) U.S. Cl.
CPC .............. *G01B 11/005* (2013.01); *G01B 5/012* (2013.01); *G01B 11/007* (2013.01); *G01B 21/04* (2013.01); *G01B 21/047* (2013.01)

(58) Field of Classification Search
CPC ...... G01B 5/012; G01B 7/012; G01B 11/00; G01B 21/00; G01B 21/04; G01B 11/007; G01B 5/00; G01B 7/00; G01B 3/00; G01N 27/00

USPC ...................... 356/614, 369, 621; 250/227.11
See application file for complete search history.

(56) References Cited

U.S. PATENT DOCUMENTS

| | | | | |
|---|---|---|---|---|
| 4,963,728 | A * | 10/1990 | Hof et al. ................ | 250/227.11 |
| 5,615,489 | A * | 4/1997 | Breyer et al. ................... | 33/503 |
| 5,825,666 | A * | 10/1998 | Freifeld ............... | G01B 11/005 279/128 |
| 6,163,973 | A * | 12/2000 | Matsumiya et al. ............ | 33/559 |
| 6,789,327 | B2 * | 9/2004 | Roth .................... | G01B 11/007 33/556 |
| 7,213,344 | B2 | 5/2007 | Rouge et al. | |
| 8,535,208 | B2 | 9/2013 | Jordil et al. | |
| 2011/0119025 | A1 * | 5/2011 | Fetter et al. .................. | 702/152 |

FOREIGN PATENT DOCUMENTS

| | | |
|---|---|---|
| DE | 3502388 A1 | 9/1985 |
| EP | 0 614 517 B1 | 9/1994 |
| EP | 1 666 833 A1 | 6/2006 |
| EP | 1 930 687 B1 | 6/2008 |
| EP | 2 384 851 A1 | 11/2011 |

\* cited by examiner

*Primary Examiner* — Tarifur Chowdhury
*Assistant Examiner* — Isiaka Akanbi
(74) *Attorney, Agent, or Firm* — Maschoff Brennan

(57) ABSTRACT

An accessory for an articulated head of a tridimensional coordinate measuring machine, machine tool or programmable manipulator. The invention includes a light source that is applicable adjacent to the measure probe in order to light selectively the measure point. The accessory can include an image capture device.

16 Claims, 3 Drawing Sheets

ACCESSORY FOR COORDINATE MEASURING MACHINE

FIELD OF THE INVENTION

The present invention relates to an accessory combinable with a measuring head such as those employed in coordinate measuring machine (CMM), or else in machine tools, programmable manipulators or robots. In embodiments, the present invention relates to a light source connectable adjacent to the measure probe of a CMM and allowing selective lighting of the measure point. The accessory can likewise include an image capture device.

DESCRIPTION OF RELATED ART

Positioning systems arranged for measuring coordinates of mechanical workpieces are known in the art. Known variants of such measure systems employ touch probes, scanning probes, or vision probes.

Coordinate measuring machines are often equipped with a variety of modular accessories, including orientable heads that allow choosing a suitable inclination for the measure probe, according to the measuring program that is desired, and the geometry of the workpieces under examination. Such orientable heads may be continuously actionable devices, in which the probe inclination can be set to any arbitrary angle, or indexed devices offering a plurality of discrete inclinations.

Document EP0614517 describes a positioning system that includes at the same time a video camera and a mechanical touch probe. This arrangement allows measuring coordinates either by touching the workpiece with the probe or by the image capture by the video camera.

DE3502388 discloses a control system for turned workpieces in which the surface of an object is scanned by a touch probe and, at the same time analyzed by a profile microscope.

These known system include two independent measuring instruments that operate in parallel and at the same time: one contact-based system and one vision-based system. Such arrangements are in general incompatible with the orientable measure heads that are conventionally employed in Coordinate Measuring Machines.

In the field of metrology it is also known to employ modular tool systems, that can be automatically connected to a mobile measuring head, for example as described in EP1930687. Such systems, in particular when they are combined with an orientable measuring head, like those known by EP1666833 and EP2384851, allow automatic measuring of complex geometries, for example engine blocks, aerodynamic profiles, or turbines.

The increased possibilities of the CMM brings however programming and debugging of the associated software procedures to a higher level of complexity, in particular when one attempts to measure complex geometry with a machine having a large number of degrees of freedom, and automatic tool switching. This task is especially challenging when the workpiece has hidden parts and large dimensions, such that the operator cannot easily appreciate visually the movements of the probe. In such cases it is sometimes necessary to employ complex lighting system and even, move around the machine to follow the probe's movement, and even in some cases, climb on the machine table. Despite all that, errors and crashes of the probe head are not exceptional, in particular during programming and debugging operations.

There is therefore a need for a system helping the programming of new parts and the analysis of error and crashes.

Moreover, tridimensional coordinate machines are more and more common in automatic quality assurance processes. It is therefore desirable to have a system that allows a better tracking of the measured objects.

BRIEF SUMMARY OF THE INVENTION

According to the invention, these aims are achieved by means of the object of the appended claims.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

In the following, the expression 'lower', 'upper', 'high', and 'low' refer to the conventional orientation of the touch probes in CMM, namely to a disposition in which the probe is vertical and the workpiece is below the probe. This is not however a limiting feature of the invention, but rather a choice aiming at simplifying the description's language. It must be understood that the invention can be used with any arbitrary orientation in space.

Figure 2:
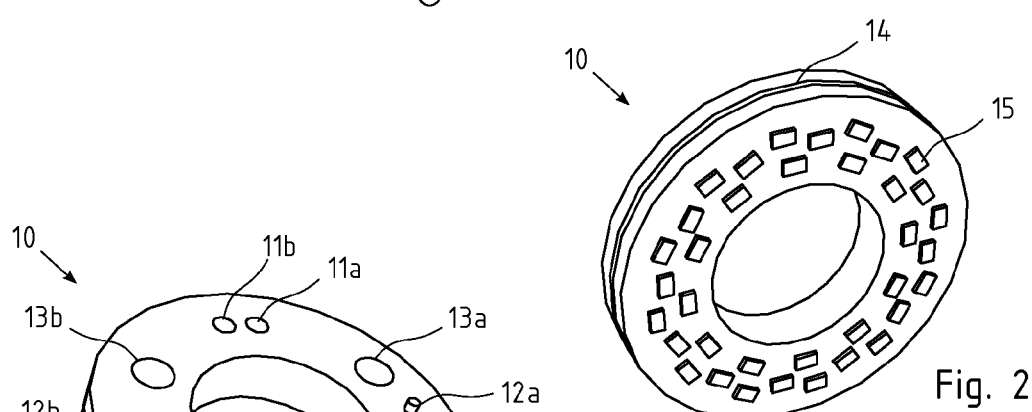
FIGS. 2 and 3 illustrate schematically a possible embodiment of the invention.
Figure 3:
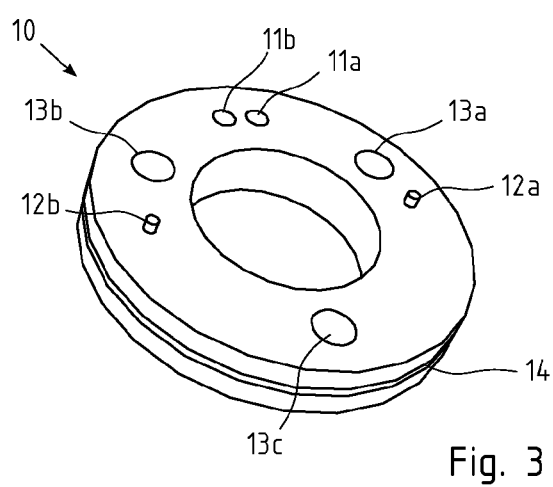

An embodiment of the invention will now be described with reference to FIGS. 1-3. The invention is associated, in this example, with an articulated head 70 that has the function of interface between a measure probe 40 and a tridimensional CMM (not represented). The measure head 70 has a support 20 that is connectable with the quill (often the 'Z' axis) of a CMM, and on the support are arranged a first rotor 25 and a second rotor 30 in series with the first one. The rotors 25 and 30 are rotatably arranged one after the other and are capable of turning about two orthogonal axes 'A' and 'B' (visible in FIGS. 5 and 6), thus setting the inclination of a measure probe 40 according to any direction in space.

In known manner, the measure head 70 can be a motorized device, equipped with actuators for setting automatically the inclination of the probe 40, or else a passive inclinable head, capable of being tilted and/or turned manually, or by actuators in the CMM. The rotation of rotors 25 and 30 can be indexed or continuous. The invention moreover, although it is advantageously combinable with an articulated head, could also be associated with a fixed measure head, or with a touch probe directly sitting on the quill of the tridimensional CMM.

The light source 10 includes on its lower face a plurality of light diodes 15 for lighting the workpiece under measurement. The opposite face of the light source 10 is connectable with the measure head 70 and has, to this purpose, electric contacts 11*a-b* for the power supply and control of light diodes 15, as well as magnets 13*a-c* for its placement. Advantageously, the light source 10 can be attached and detached to and from the measure head without the use of tools, and can be stored in a tool magazine, and retrieved therefrom automatically by the CMM. Pins 12*a-b* cooperate with corresponding apertures 32*a-b* (visible on FIG. 4) on the rotor 30 and determine univocally the orientation of the ring 10 on the latter.

The light diodes 15 can be chosen to emit white light, or any other visible, infrared or UV light, according to the needs. In a possible variant, the source 10 includes light diodes with different emission spectra that can be activated selectively.

In variants the light diodes 15 may be equipped with concentrating optics (for example a Fresnel lens) in order to generate a concentrated beam of light on the measure point, or rather of a diffuser or a divergent optics, to obtain a wide lighting field. It is also possible to foresee a variable optics, or groups of light diodes with and without concentrating optics, in order to obtain, by activating selectively the groups of diodes, either a narrow lighting beam or a wide lighting beam.

According to other variants, the lighting source could project on the workpiece a uniform lighting field, or a field with alternating light and dark fringes for better accentuating height variations. The lighting mode could be also in this case selectable.

Preferably the light source includes a microprocessor or a logic circuit in order to generate internally all the signals needed by the LED in the different functioning modes, without multiplying unnecessarily the number of control contacts.

Preferably, the source 10 has a ring shape with a central opening that allows the passage of a measure probe 40. This probe could have a touch probe 50, as represented in the drawings, or else be a contactless probe, for example a laser probe.

Thanks to the invention, the measure point probed by the probe 40 is always in the lighting field of the source 10, independently from the position and inclination of the measure head 70. This arrangement is especially advantageous when measuring and programming the measurement of complex parts. The operator can check visually the motion of the probe 40 in relation to the important features of the part that is measured, independently from available light. The measured elements and points are always perfectly lighted for any position and the inclination of the probe.

Preferably the light source 10 includes also a light emitting device on its side, for example a ring of light diodes 14 that can be seen from any direction. This device can be used for signaling purposes as a visual indicator to transmit any useful information to the operator. It can for example be caused to blink to indicate a contact with the workpiece, or the acquisition of a measure point; the indicator 14 may also indicate with a color code the normal execution of a predetermined measure program (green) or abnormal conditions (red), like for example dimension outside the acceptable tolerances, or unexpected crashes.

According to a preferred variant, the invention includes as well an image capture device 18, for example a video camera, united with the measure head 70 and positioned in such a manner as to capture images of the measure probe during its motion, or images of the measure points on the workpiece. Images captured by the camera are preferably reproduced on a display, thus allowing the operator to see and follow the movements of the probe from his or her workstation. In this way, measurement programs for new parts can be easily and quickly set up, reducing crash risks, and without leaving the workstation.

Figure 1:
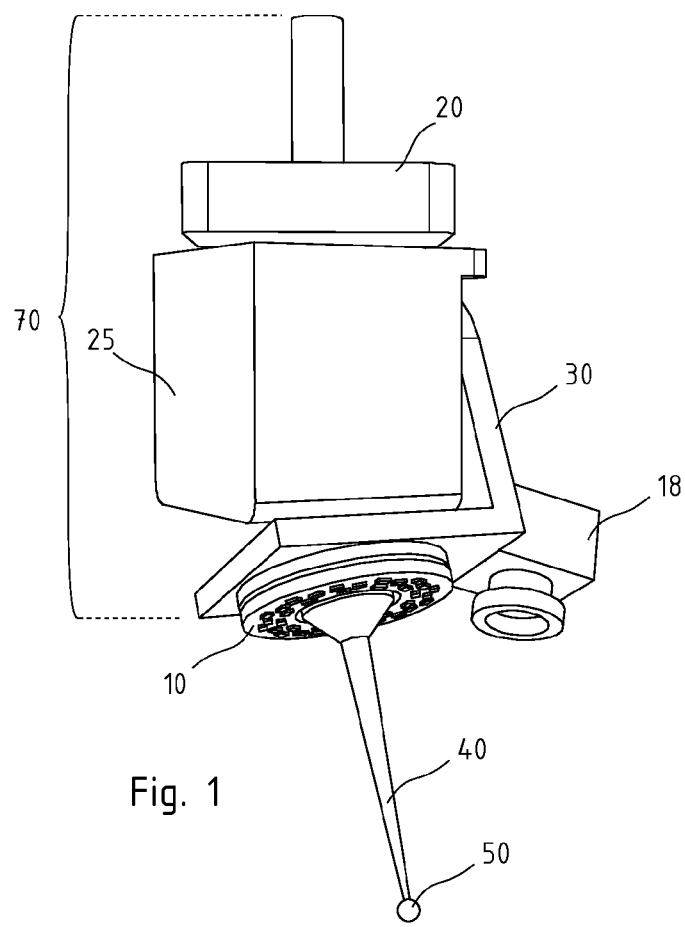
FIG. 1 shows schematically an articulated orientable head for a tridimensional coordinate measuring machine, equipped with a device according to the present invention.
Figure 4:
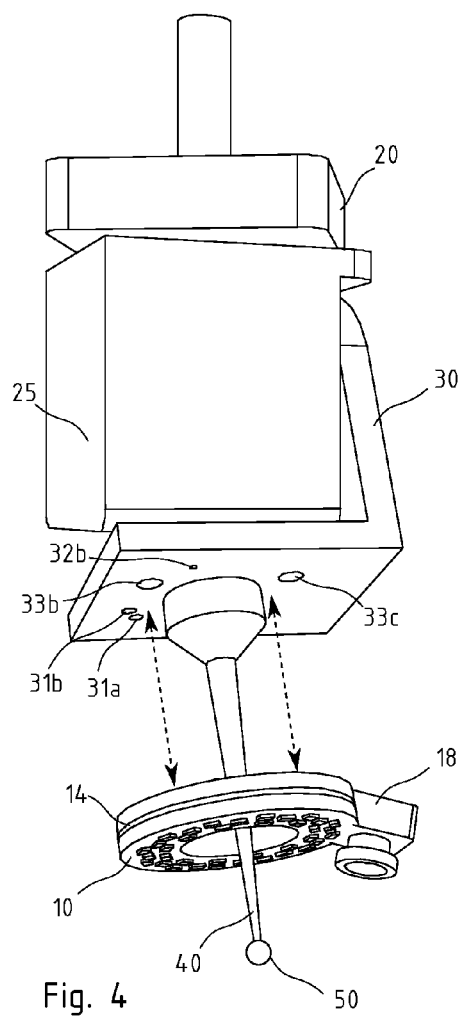
FIG. 4 shows schematically a variant of the device of the invention together with an articulated head on which it can be installed.

Camera 18 can be connected to the measure head 70 independently from the lighting ring 10, as shown in FIG. 1, or be united to the latter, as in the variant illustrated by FIG. 4.

Figure 5:
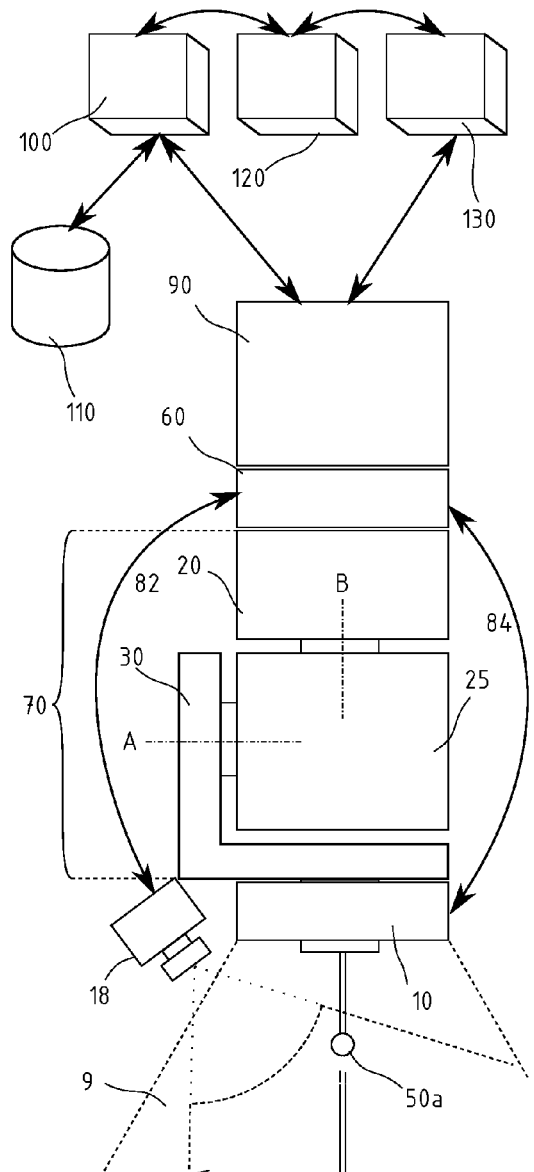
FIG. 5 is a simplified diagram of the invention illustrating the information flow between the invention and control devices in the CMM.

FIG. 5 shows schematically the lighting field 9 and the vision field 19 of the invention. The lighting field 9 is determined, as mentioned above, by the emission angle of light diodes 15 and eventually by the associated optics. The field of sharp vision 19 is determined by the vision angle of the camera 18 and by its minimal and maximal focus distances. Preferably, the camera 18 is arranged to work in hyperfocal mode, restituting sharp images of objects from a minimal distance to infinity. Variants with zoom and auto-focus optics are also possible, however.

Preferably, the optical and geometric parameters of the system are chosen such as to have in the lighting field 9 and in the sharp vision field 19 the workpiece 140 and the probe 50*a-b* for all foreseeable lengths of the probe.

Figure 6:
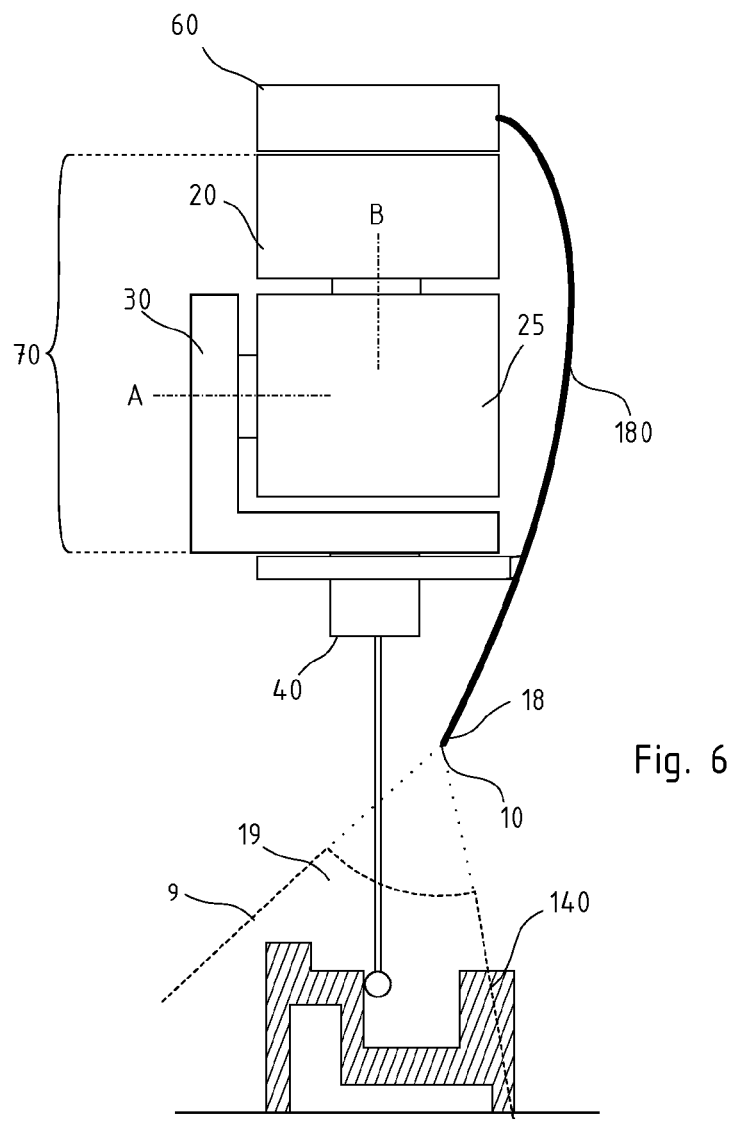
FIG. 6 is a simplified representation of a variant of the invention comprising optical fibers for lighting and/or imaging.

FIG. 6 illustrates a variant of the invention in which the lighting and/or the image capture rely on fiber optic devices 180. This arrangement allows capturing images at very close distance, and high-angle lighting modes, useful for example to check the surface state of the part 140. It would be possible also to use a conventional lighting system with a fiber optics imaging system, or inversely a conventional camera with a fiber illumination. In a non-represented variant, the light could be transmitted along the probe stylus 50 and shine from the interior of the touch probe 50.

Returning now to FIG. 5, it illustrates a possible organization of the information flow between the various elements of the CMM and the invention. The measuring machine includes for example a machine controller 130 that is in charge for the motions of axes XYZ of the CMM, a head controller 120 that oversees the axes A and B of the articulated measure head 70, and a workstation 100 that executes a higher-level piece software, which is used for trajectory programming and analysis of the measure results. A storage unit 110 is foreseen for recording programs and results.

These elements are interconnected by suitable data links, for example Ethernet, CANbus, or other industrial buses, serial RS-232 or RS-422 links, or any other appropriate communication channel. It is not required either that the control units 100, 120, 130 be embodied into separate pieces of hardware. Their functions could also be provided by a single unit, in which the controllers 100, 120, 130 may exist as separate or combined software entities, or by any number of sub-systems.

This variant of the invention comprises an interface unit 60, here represented between the support element 20 and the 'Z' axis of the CMM 90, assuring the communication between the camera 18, the light source 10, and the controllers 100, 120, 130. In a CMM, the different components may be separated by considerable distances, and it is not uncommon that the measure head 70 and the controllers 100, 120, 130 be connected by cables with lengths of ten meters or more. Interface unit 60 assures, among other things, the conversion of data coming from the camera into a format compatible with such long connections. It would be conceivable, for example, that the camera 18 be equipped with an analogue video, VGA, DVI, USB, or other output, and that the interface units 60 translates these data into a digital video stream that is then transmitted to the controller 100 on an Ethernet or wireless link. The position of the interface unit is not necessarily limited to that of the figure, and the invention could well include variants in which the interface unit is integrated in the articulated head 70, in the camera 18, or in the ring 10.

Figure 7:
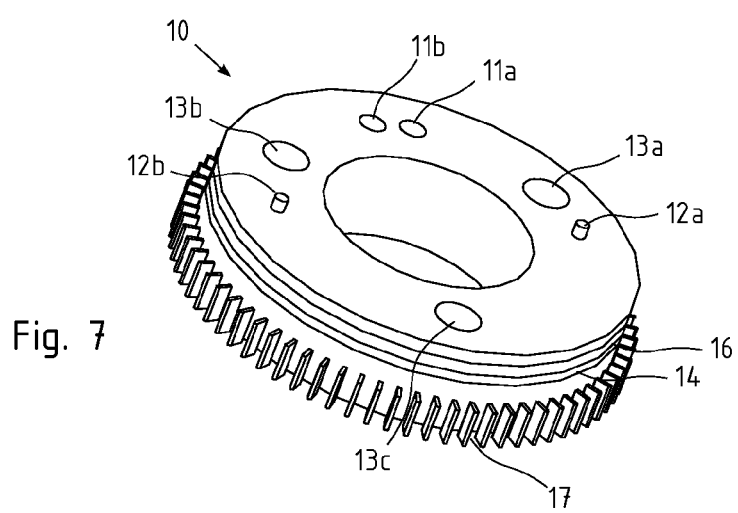
FIG. 7 illustrates a variant of the invention having means for limiting the heat transfer to the measure head.

The light diodes and the camera 18 necessarily dissipate during their functioning, some heat that could possibly affect the precision of the measure probe 40 and of the inclination mechanism of the articulated head 70. FIG. 7 represents a variant of the invention that allows limiting these shortcomings. The light source 10 includes a thermal insulation layer 16 for limiting heat transfer to the head 70 and the probe 40, as well as cooling fins 17 to improve the thermal exchange with ambient air. It is also possible to operate the accessory of the invention during part programming and debugging, and to switch it off, or set it at a reduced luminosity during routine measurements or when ultimate precision is sought.

As mentioned above, the invention proposes to simplify the programming of complex parts with hidden elements. The system has also other applications however, including:

Identification and Tracking

The measured parts can be equipped with a serial number, printed in OCR-readable format, or encoded in a barcode or in a bidimensional barcode, or any other visual indicia allowing the identification. The control unit 100 runs a software that identifies automatically the parts from the images provided by the camera 18 and associates their serial number with the measure results recorded in the storage 110.

Type Recognition

In this variant, the control unit 100 executes a software arranged for recognizing the type of a part from its form, or from a serial number as indicated above, based on the image captured by the camera 18, and for selecting an appropriate measuring program from a plurality of available programs. In this way, the CMM can process automatically a plurality of parts of different types, applying in each case a specific measurement procedure.

Crash Prevention and Reporting

The invention can be used also to prevent and analyze crashes between the probe 40, or the head 70, and the workpiece or other objects. These crashes can derive from programming errors or false positioning of workpieces, and might cause misalignments, failures, or loss of precision.

In a variant, a control software executed by the control unit 100 examines in real time the images from the camera 18 and, when it determines that an unforeseen crash is imminent, activates a procedure of alarm or prevention.

In another possible variant, the series of imaged captured by camera 18 before and/or during and/or after the crash is stored for later analysis.

The orientation of the camera 18, which provides a close-up image of the contact point to the operator, changes with the movements of the wrist. In a further variant of the invention, to enable the operator to locate the wrist and camera 18 within the volume of the CMM a second camera with a fixed and large field of view can be installed. Alternately, a virtual image of the camera 18 in the volume of the CMM can be provided by the CMM control program.

REFERENCE NUMBERS

A rotation axis
B rotation axis
9 lighted zone
10 accessory/light source
11a-b contact
12a-b pin
13a-c magnet
14 optical indicator
15 light source
16 thermal insulation
17 fins
18 camera
19 zone of sharp vision
20 support
25 first rotor
30 second rotor
31a-b contact
32b aperture
33b-c magnet
40 stylus/probe
50 touch probe
50a-b touch probes
60 interface element
70 articulated head
82 link of image data
84 power supply and control of LEDs
90 'Z' axis/quill of the CMM
100 workstation
110 storage
120 CMM controller
130 head controller
140 workpiece

The invention claimed is:

1. A head device for a tridimensional coordinate measuring machine, connectable to a measure probe for measuring coordinates of points on a workpiece, in combination with a light source arranged adjacent to the measure probe in such a manner that the light source projects light on the point whose coordinates are measured and/or on the workpiece,
   wherein the light source has an annular shape and is coaxial to the measure probe, wherein the measure probe passes through a central opening of the light source, wherein the head device comprises a first rotor and a second rotor, the first rotor and the second rotor being rotatable relative to one another, and wherein the light source is magnetically attached to the second rotor.

2. The device of claim 1, wherein the light source includes a microprocessor programmed to change the lighting of the measure point.

3. The device of claim 1, wherein the light source is arranged to project a uniform lighting field and/or a lighting field with an alternate light and dark zones.

4. The device of claim 1, including a light emitting device on its side for signaling purposes.

5. The device of claim 4, wherein the image capture device is arrange to capture an image of the workpiece in color and/or in infrared light and/or in UV light and/or a thermal image.

6. Method of measuring workpieces in a tridimensional coordinate measure machine, comprising identification of the pieces based on the images captured by the device of claim 4.

7. The method of claim 6, wherein the pieces carry identification numbers or barcodes or bidimensional barcodes.

8. Method of measuring workpieces in a tridimensional coordinate measure machine, comprising the selection of a measuring program based on the images captured by the device of claim 4.

9. Method of preventing and analyzing crashes in a tridimensional coordinate measure machine, based on the images captured by the device of claim 4.

10. The device of claim 1, comprising an image capture device united to the measure head or to the light source.

11. The device of claim 1, comprising an image capture device united to the light source of annular shape.

12. The device of claim 1, wherein the light source and/or the image capture device include optical fibers.

13. The device of claim 1, comprising thermal insulation means for limiting heat transfer to the measure head.

14. The device of claim 1, comprising fins for limiting heat transfer to the measure head.

15. A head device for a tridimensional coordinate measuring machine, connectable to a measure probe for measuring coordinates of points on a workpiece, in combination with a light source arranged adjacent to the measure probe in such a manner that the light source projects light on the point whose coordinates are measured and/or on the workpiece, wherein the light source has annular shape and is coaxial to the measure probe, and the measure probe and the light source are united to a rotatable element of the articulated head device, wherein the measure probe passes through a central opening of the light source, which is magnetically attached to the head device, wherein the head device comprises a first rotor and a second rotor, the first rotor and the second rotor being rotatable relative to one another, and wherein the light source is magnetically attached to the second rotor.

16. A head device for a tridimensional coordinate measuring machine, connectable to a measure probe for measuring coordinates of points on a workpiece, in combination with a light source arranged adjacent to the measure probe in such a manner that the light source projects light on the point whose coordinates are measured and/or on the workpiece, wherein the light source has annular shape and is coaxial to the measure probe, wherein a stylus of the measure probe passes through a central opening of the light source, wherein the head device comprises a first rotor and a second rotor, the first rotor and the second rotor being rotatable relative to one another, and wherein the light source is magnetically attached to the second rotor.

* * * * *